(12) United States Patent
Sunstrum

(10) Patent No.: US 7,599,355 B2
(45) Date of Patent: Oct. 6, 2009

(54) SERVER-LESS VOIP (VOICE OVER INTERNET PROTOCOL) PHONE SYSTEM

(75) Inventor: Martin T. Sunstrum, Calgary (CA)

(73) Assignee: Aksys Networks Inc., Calgary (CA)

( * ) Notice: Subject to any disclaimer, the term of this patent is extended or adjusted under 35 U.S.C. 154(b) by 943 days.

(21) Appl. No.: 10/917,814

(22) Filed: Aug. 13, 2004

(65) Prior Publication Data

US 2005/0074031 A1 Apr. 7, 2005

Related U.S. Application Data

(60) Provisional application No. 60/481,232, filed on Aug. 14, 2003.

(51) Int. Cl.
*H04L 12/66* (2006.01)
(52) U.S. Cl. .................................... 370/352
(58) Field of Classification Search .............. None
See application file for complete search history.

(56) References Cited

U.S. PATENT DOCUMENTS

| | | | |
|---|---|---|---|
| 4,757,496 A | 7/1988 | Bartholet et al. | |
| 5,883,944 A | 3/1999 | Burke et al. | |
| 5,887,054 A | 3/1999 | Burke et al. | |
| 5,991,634 A | 11/1999 | Hui et al. | |
| 6,256,319 B1 | 7/2001 | Apgar et al. | |
| 6,449,269 B1 | 9/2002 | Edholm | |
| 7,002,912 B2* | 2/2006 | Wengrovitz | 370/230 |
| 7,257,201 B2* | 8/2007 | Singh et al. | 370/356 |
| 7,376,124 B2* | 5/2008 | Lee et al. | 370/352 |
| 7,519,732 B2* | 4/2009 | Yeom | 370/352 |
| 2003/0095569 A1* | 5/2003 | Wengrovitz et al. | 370/467 |
| 2004/0240656 A1* | 12/2004 | Poustchi | 379/220.01 |

(Continued)

FOREIGN PATENT DOCUMENTS

CA 2372218 11/2000

(Continued)

OTHER PUBLICATIONS

Rosenberg, et al., "SIP: Session Initiation Protocol", *Network Working Group*, (Jun. 2002), pp. 1-202.

(Continued)

*Primary Examiner*—Anh-Vu H Ly
(74) *Attorney, Agent, or Firm*—Blakely Sokoloff Taylor & Zafman LLP

(57) ABSTRACT

An apparatus and method for effecting sophisticated telephony services using hybrid POTS and VoIP transport without resorting to central servers or PBXs is provided. Key to the system is the use of on-phone processing capabilities comprising several A-D/D-A, memory and addressing, audio-mixing, program memory and programmable computing circuits or components. The system performs required IP and VoIP protocol stacks (UDP, RTP, and SIP for example) and POTS functionality. Optionally, fail-over from set-power may be provided using POTS line voltages.

The phones of this invention self-configure dependent upon the network environment to which they are attached, and direct call and other functionality digitally under programmed computing control, thus being highly configurable; redundancy between networked phone devices adds robustness.

The telephone system is comprised of independent telephony devices operating on a LAN and/or WAN TCP/IP-based connection The inventive concept allows for greater system scalability with lower cost, reliability and flexibility.

8 Claims, 11 Drawing Sheets

U.S. PATENT DOCUMENTS

2005/0021872 A1* 1/2005 Poustchi et al. ............. 709/250

FOREIGN PATENT DOCUMENTS

WO    WO-03005691    1/2003

OTHER PUBLICATIONS

Schulzrinne, et al., "RTP: A Transport Protocol for Real-Time Applications", *Network Working Group*, (Jan. 1996), pp. 1-75.

Search Report, "International Searching Authority", PCT/CA2004/001515, pp. 13.

Sysmaster (TM), "VM 2100 VoIP Products", *VM2100 IP/PBX IP-based telephone set providing station-to-station, IP calls, and local PSTN/PBX gateway services*. Dec. 2004, http://www.sysmaster.com/p_vp_pbx_phones.htm, pp. 3.

RTP: A Transport Protocol for Real Time Applications. Date: Jul. 2003. Schulzrinne et al.

* cited by examiner

500

SERVER-LESS VOIP (VOICE OVER INTERNET PROTOCOL) PHONE SYSTEM

CROSS REFERENCE TO RELATED APPLICATIONS

This application claims the benefit of U.S. Provisional Application No. 60/481,232, filed Aug. 14, 2003, which is incorporated herein by reference.

FIELD OF THE INVENTION

This invention relates generally to communications, more particularly, to customer premises-based telephone systems.

BACKGROUND OF THE INVENTION

Phone systems for businesses have typically provided a higher level of functionality than basic telephone service, providing functions such as blind call transfer, attended call transfer, line and set availability indication, to name but a few. This functionality has classically been provided by some type of central control, most commonly a Private Branch Exchange (PBX) or more recently "telephone server".

The central control systems have drawbacks in terms of high initial cost, single point of failure and complexity in setup and administration. The initial cost of the central control point was particularly prohibitive to small businesses that only needed a few telephones.

To address these limitations some phone systems have been developed that don't have a central control. An example of a telephone system without a central control point is U.S. Pat. No. 4,757,496, titled "Distributed Telephone System", which describes a telephone system where each Telephone Set is coupled to a common coaxial cable. Unfortunately, this system still requires either a fixed administration, or manual programming, to set some system parameters such as Telephone Set addresses. More importantly it was limited in that the phones had to be geographically located relatively close together.

U.S. Pat. No. 6,256,319, titled "Plug and Play Telephone System" also describes a telephone system without a central control point. It describes a system where each Telephone Set is connected to every other Telephone Sets by a common telephone line connection. Across this common telephone line connection a radio frequency (RF) based communication channel is created. Unfortunately, this RF communication channel method imposes numerous limitations on the telephone system operation. Notably, these include:

- limits to the number of telephone sets that can share the common telephone line connection because of regulatory limitations on "ringer equivalence number" (REN) loading factors. This factor limits how large the telephone system can become, typically up to only 12 telephone sets.
- the RF communication channel method is limited by telephone line lengths, terminations and interference with common DSL services. This factor limits the reliability and performance of the system in real-world deployments.
- the RF communication channel method only allows the telephone system to operate from a single user premise. This factor prevents the system from operating across a geographically distributed area.
- the RF communication channel method only allows a limited number of simultaneous full-duplex audio paths across the communication channel. This factor limits system functionality and size, because users and/or features are blocked when all of the full-duplex audio paths are in use. The more users in a system, the greater the likelihood that blocking would occur.
- the RF communication channel method, as commonly implemented, requires that multiple analog phone lines are cabled to each phone location. This factor increases the cost and complexity of wiring up the phone system in real-world deployments.

With the advent of Voice-over-data or Voice-over-Internet-Protocol (VOIP), business oriented telephone systems have been created that use VOIP telephone sets and VOIP aware central point of control commonly called an "IP PBX" or simply "telephone server". This central control point provided functionality similar to classical PBXs and had the same drawbacks of single point of failure and high initial cost relative to deployments of small numbers of phone sets.

While individual VOIP phones could call each other without the use of a IP PBX, this is more analogous to basic telephone service without such features as set-availability or line-in-use indicators.

SUMMARY OF THE INVENTION

A VoIP phone apparatus is provided that comprises an Foreign Exchange Office (FXO) circuit attachable to an external Plain Old Telephone Service (POTS) line and operatively connected to a Telephony Control IC and a Microcontroller, the FXO circuit providing Ringing and Status signals to the Telephony Control IC and generalized FXO-RX and FXO-TX signals to an Analog Audio Switch Matrix subcomponent of the Telephony Control IC. The apparatus also has at least one Audio Transducer set comprising at least one microphone and at least one speaker operatively connected to the included Analog Audio Switch Matrix subcomponent of the Telephony Control IC. Further it has the Microcontroller operatively connected to a keypad, a Computing Processor, an electrical power source, and the Telephony Control IC, for providing and receiving control and state signals to and from the Telephony Control IC. The phone apparatus also has at least two A-D converter sets operatively connected to the Computing Processor for dealing with digitized audio signal I/O with said Computing Processor, providing matching analog signal I/O over two signal sets: with the Telephony Control IC. The Computing Processor is equipped with a Memory Subsystem and Computer Networks interface capable of communication with a Local Area Network (LAN) or a Wide Area Network (WAN), if connected, and a user interface comprising a display, input device and indicators.

Also provided is a server-less VoIP system comprising at least two telephone sets connected on a network, where each of said telephone sets is comprised of at least computer processing, memory, Computer Network interface, and audio processing. Each telephone set has its own system and call-processing software and communicates via its Computer Network interface with other devices on the network using IP or similar un-switching communications protocols across a LAN or WAN network using IP or similar packet-switching protocols.

A method of operating a server-less phone system is provided where a call is received by one VoIP phone in a server-less system. The incoming call can be either a VoIP call or an FXO call. The phone that has received the call can then invite multiple other phones simultaneously by sending each a message such as the Session Initiation Protocol (SIP) INVITE message. This has the effect that said multiple phones all ring or otherwise behave as each is configured to behave. The first phone or device to respond to the initiating phone with a SIP OK message will have the call routed to it. The call requests to the other remaining phones will be cancelled. How the call is routed to the responding phone varies with the type of the original call. If it was a call originating on the FXO lines, the call is gatewayed to the responding phone. If the call originating as a SIP call, it can be transferred to the responding phone.

The VoIP phone apparatus also provides a means of being able to both make and receive FXO calls when main power is unavailable. The apparatus makes use of power from the phone network when externally supplied electrical power fails. To do this the phone includes a sensing and switching means which provides power for the system from the externally supplied electrical power when that source is available, but when the sensing means senses that only phone-line power is available it switches power off to parts of the system including the Computing Processor with its associated A-D converter sets, memory subsystem, Computer Network interface, display and indicators. It then directs available power to the Telephony Control IC and other associated subcomponents of the system, thus "failing over" to become a minimal POTS telephone set when externally supplied electrical power is unavailable but power from the phone network is available.

The VoIP Phone apparatus provides a means for the user to selectively control the recording of audio on the phone. The user can begin and end recording either through a key on the user interface or based upon a configuration file. The configuration file could, for example, define that all calls from or to a particular number always be recorded. The audio selected to be recorded is digitized and is either saved internal to the phone in its memory for later retrieval or first saved then moved external to the phone, typically in the form of an audio file attachment to an email or series of emails. When the recording size exceeds the capacity of the phone's memory, the recording can emailed or otherwise moved external to the phone over the network, in increments as the recording reaches certain intervals or size. The recording of audio can be done both while the phone is not otherwise in use and while any type of call is in progress including an FXO call, a VoIP call, or a conference call.

A method of using the VoIP phone apparatus is provided whereby a user at another VoIP phone connected to the apparatus via a LAN or WAN can monitor a call on the apparatus without one or more parties to the call being aware of such monitoring. Similarly a method is provided whereby the audio mixing capabilities of the phone are used so the monitoring party on the call can speak to the user of the apparatus without the other parties to the call being able to hear what is spoken by this monitoring person.

DETAILED DESCRIPTION

General Overview

Figure 1:
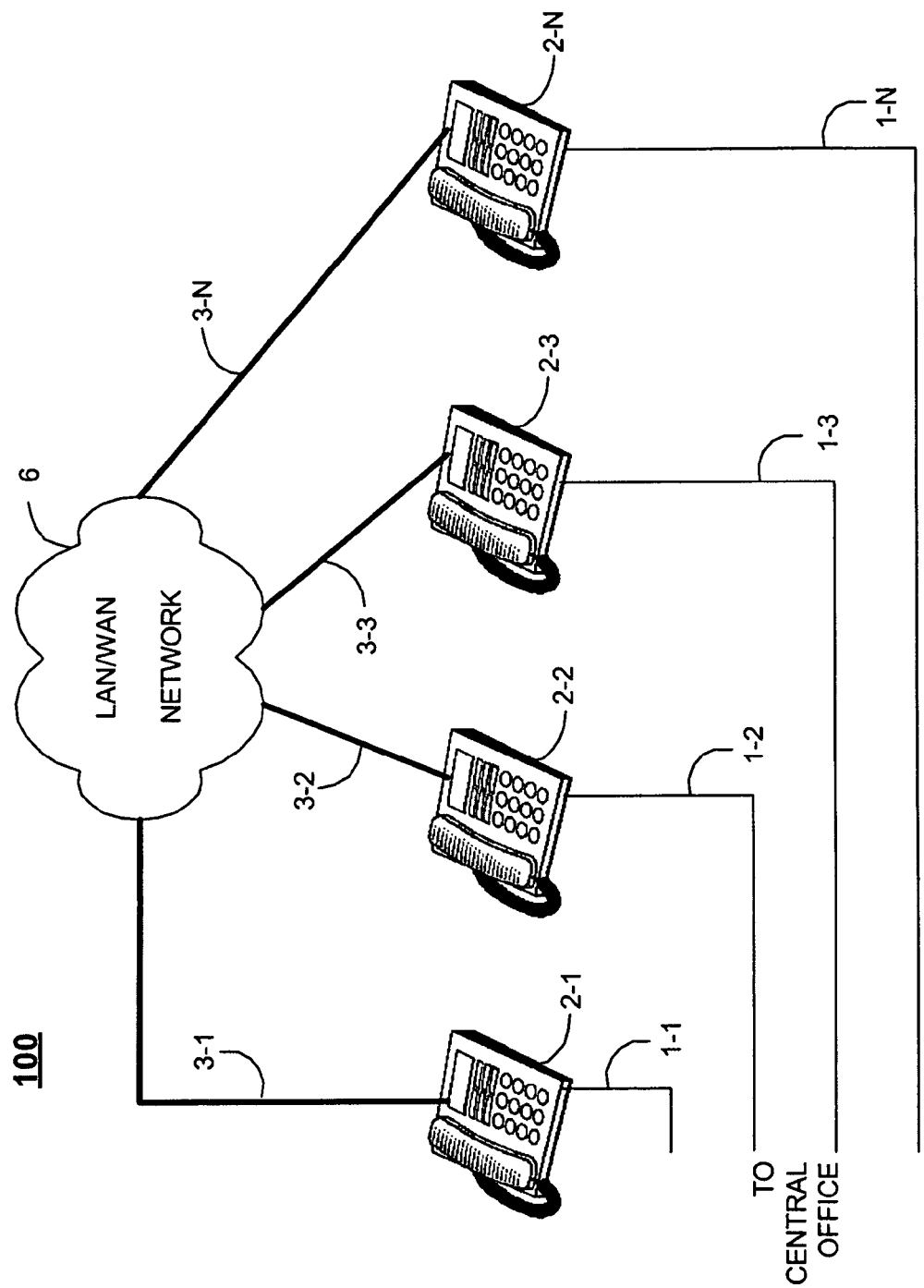
FIG. 1 shows a block diagram of an illustrative Telephone System 100.

A preferred embodiment of the Server-less VoIP Telephone System invention is illustrated in FIG. 1. Telephone System 100 is comprised of one or more Telephone Set 2-1 through to 2-N. Each Telephone Set can optionally be connected to a unique Analog Telephone Line 1-1 through to 1-N. The Analog Telephone Line is a loop-start wire pair representative of facilities provided by a local central office or PBX (not shown), and is known in the art.

Each Telephone Set 2-1 through to 2-N is connected to a LAN/WAN Network 6 via LAN Connections 3-1 through to 3-N. For the purposes of this description, each LAN Connection is assumed to be a commodity 10/100 Mbps WEE 802.3 Ethernet LAN cable connection. However, the LAN/Connection can also be made other ways, such as by Bluetooth™, 802.11 or other wireless means, routing IP traffic over other connections such as Firewire™ or USB™. This invention is not to be limited by the style of mechanical LAN Connector described, which is merely exemplary of the current preferred embodiment. The LAN/WAN Network 6 operates using industry-standard Transmission Control Protocol/Internet Protocol (TCP/IP) networking protocols. This LAN/WAN Network 6 consists of local area network(s) (LAN) and/or wide area network(s) (WAN).

This LAN/WAN Network 6 can be comprised of any one or more of the following items: local Ethernet switches, hubs, routers, firewalls, network address translators (NAT), intranets, public Internet, private TCP/IP WAN networks, or any other related network devices and implementations.

The purpose of the LAN/WAN Network 6 is to provide a local and/or wide area switching network for transport of digitized voice and control data to/from the Telephone Set, in addition to providing a communication medium for other common industry TCP/IP devices (PCs, printers, servers, Internet, other devices and networks). These TCP/IP network elements, and the mechanisms behind their operation, are well known to one skilled in the art, and will not be described further.

With just these elements alone, a full-featured telephone system is created. It supports all common calling modes found in a conventional phone system, such as external PSTN calls and internal business intercom calls. Unlike the prior art, the phone system can also handle voice-over-Internet-protocol (VoIP) calls across a wide area network (WAN).

This simple Telephone System 100 can also provide desirable voice messaging features such as auto-attendant and voicemail functionality. And unlike any other prior art, the Telephone System 100 can provide a method for advanced voice messaging features, whereby voice mail messages, call recordings, and/or voice recordings messages are handled by the Telephone Set alone, and can be delivered to end users or services via common TCP/IP delivery techniques such as e-mail.

The methods behind the delivery of these features will be described later in this description.

Telephone Set Description

Figure 2:
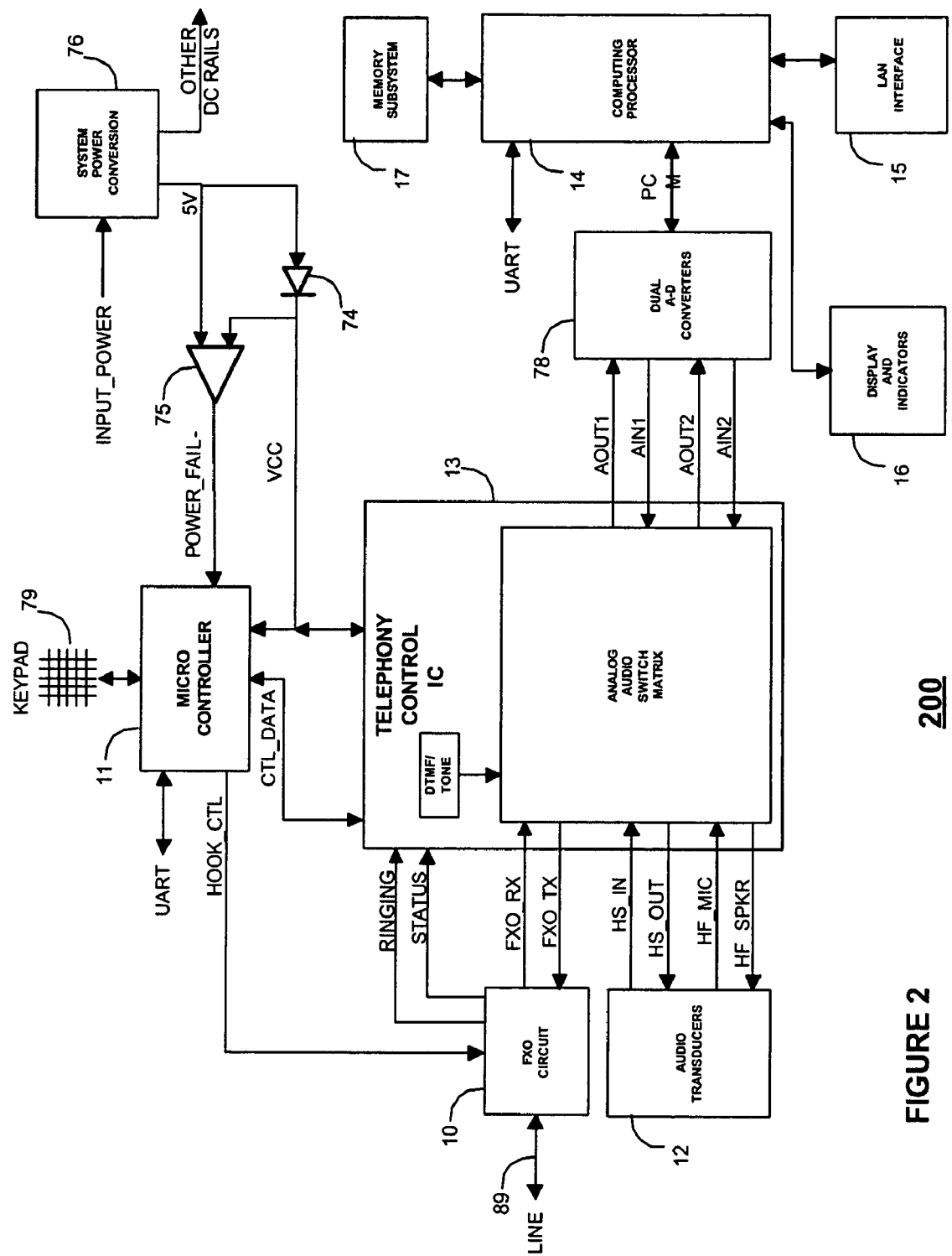
FIG. 2 shows a functional-level block diagram of an illustrative Telephone Set 200 device.

The telephone set is the inventive apparatus for the Telephone System 100. For the purposes of this description, each Telephone Set 2-1 through to 2-N is assumed to be identical in terms of design. As such, only one illustrative telephone set, Telephone Set—200 is described in detail below. An illustrative functional block diagram of a portion of Telephone Set 200, which embodies the principles of the invention, is shown in FIG. 2. The following describes pertinent design details and the function of each element referenced in—FIG. 2.

FXO Circuit 10; This circuit provides the functionality of a FXO circuit familiar to one skilled in the art. This includes on and off hook switch control. There is a 2 to 4 wire hybrid audio circuit interfacing the 2 wire telephone line 89 loop start signal pair to the (4 wire) transmit and receive audio signals FXO_TX and FXO_RX respectively.

The STATUS signal provides such status information as FXO line voltage and/or current indications. Analog audio signals FXO_RX and FXO_TX and STATUS, and the ringing voltage signal (RINGING) signal is connected to the Telephone Control IC 13.

It is also noted that the FXO Circuit 10 provides the Telephone Set 200 ground signal reference. This ground signal reference is accomplished with a common diode bridge following the 2 wire telephone line 89 TIP and RING leads. Ground is effectively referenced to the most negative voltage of the telephone line.

Audio Transducers 12; These audio transducers represent the common handset audio and speakerphone transducers. Their design and interconnection are familiar to one skilled in the art. For the handset, the analog audio signals are HS_IN and HS_OUT. For the speakerphone transducers, the analog audio signals are HF_MIC and HF_SPKR.

Telephony Control IC 13; This integrated circuit (IC) provides a non-blocking analog audio switch matrix between the following analog audio inputs: FXO-RX, HS-IN, HF-MIC, AIN1, AIN2 and DTMF/TONE (internal) and the following analog audio outputs: FXO-TX, HS-OUT, HF-SPKR, AOUT1, AOUT2. The internal audio generator DTMFP-TONE is able to generate Dial-Tone Multi-Frequency (DTMF) and simple tone audio signals.

A key feature of the Telephony Control IC 13 is that it can generate power, herein after referred to as "VCC" power, when the main 5V power is not present. This VCC power is derived from the FXO line current when off-hook, or from the FXO ringing signal when on-hook. Only the Telephony Control IC 13, the Microcontroller 11, the FXO Circuit 10 and the Audio Transducers 12 are powered with VCC.

The Telephony Control IC 13 is controlled, and can provide status information to the Microcontroller 11 via the CTL_DATA signals.

5V Power Blocking Diode 74; This diode provides isolation between the 5V and VCC DC power signals. As mentioned in describing the Telephony Control IC 13, if the 5V DC power signal is not present, this diode will prevent any VCC DC power generated by the Telephony Control IC 13 from feeding into the 5V power rail. It is, of course, understood that other voltages may be used in different embodiments of this invention without taking away from the invention disclosed here.

5V Power Comparator 75; This is a simple voltage comparator circuit that compares the VCC and 5V voltage levels. If the 5V signal is present, a logic 1 POWERFAIL-signal is presented to the Microcontroller 11, otherwise a logic 0 POWERFAIL-signal is presented. To prevent electrical latchup of the VCC powered devices from the other non-powered devices in the apparatus, the Microcontroller 11 uses this signal to know when to electrically isolate the UART signal. The AOUT1 and AOUT2 signals are capacitive-coupled to the Dual A-D Converters 78, so they already would have DC isolation between the VCC powered Telephone Control IC 13 and the non-VCC powered Dual A-D Converters 78. The design of this comparator is well known to one skilled in the art.

Microcontroller 11; The Microcontroller 11 is powered via the VCC DC power signal, which is derived via the main 5V power rail, or in the absence of such, via VCC generated by the Telephony Control IC 13. This microcontroller requires a low operating current (typically <8 mA). This limit is because the Telephony Control IC 13 is limited in how much power (current) it can deliver to VCC when the main 5V power rail is absent.

Via the CTL DATA and HOOK-CTL signals, the Microcontroller 11 can control the operation of the FXO Circuit 10 and the Telephony Control IC 13. The Microcontroller 11 has a standard 2-wire UART connection to the Computing Processor 14, whose purpose is to communicate messages between each other.

The Microcontroller 11 also performs key press detection on the Keypad Scanning Matrix 79, as is familiar to one skilled in the art.

The control firmware resident in this Microcontroller 11 operates in 2 modes. When it detects lack of 5V power via the 5V Power Comparator 75, the Microcontroller 11 operates in Autonomous mode. In Autonomous mode, the Microcontroller 11 fully controls the FXO Circuit 10 and the Telephony Control IC 13. This allows the Telephone Set 200 to operate similar to a plain analog POTS telephone.

When it detects the presence of 5V power via the 5V Power Comparator 75, the Microcontroller 11 operates in Slave mode. In Slave mode, the Microcontroller 11 reports status information (key presses, ringing signals, etc.) using UART messages to the Computing Processor 14. The FXO Circuit 10 and the Telephony Control IC 13 are only controlled by the Microcontroller 11 upon reception of the appropriate UART message(s) from the Computing Processor 14.

The design of the microcontroller firmware supporting Autonomous and Slave modes is familiar to one skilled in the art.

To one skilled in the art, they can now see how the Telephone Set 200 can operate without the main 5V power rail, and act as a regular POTS line-powered telephone. Advantageously compared to the prior art, one can see that the inventive Telephone System 100 can provide power fail operation to each of the unique Analog Telephone Line 1-1- through to 1-N connected to Telephone Sets 2-1 through to 2-N.

For the duration of this patent description, it is described such that it is assumed that the Telephone Set 200 is operating under normal 5V powered conditions.

Keypad Scanning Matrix 79; This is a standard row/column keypad scan matrix that is familiar to one skilled in the art. It is operated by the Microcontroller 11, and its purpose is to detect when keys are pressed and released.

System Power Conversion 76; The System Power Conversion 76 provides various DC voltage rails as needed by the Telephone Set 200. For the purposes of this description, 5V is a required voltage rail. Other DC rails are provided as needed by any specific design. The INPUT POWER is any AC or DC input power signal that is appropriate for the design. It could be delivered via a wall power cube, or delivered through wires on the LAN cable (e.g. as defined by IEEE 802.3af standard). Both of these methods are known by one skilled in the art, and other methods are of course also obvious.

Since the description of this design indicates that Telephone Set 200 ground signal is referenced to the telephone line, INPUT POWER must have appropriate safety/regulatory voltage isolation from the telephone line, as is familiar to one skilled in the art. Alternatively, one skilled in the art can devise alternative electrical designs whereby the FXO Circuit 10 provides the necessary safety/regulatory voltage isolation, and yet still provide power fail operation.

Dual A-D Converters 78; The Dual A-D Converters 78 provide 2 channels of analog-digital and digital-analog conversion paths to the analog audio signals AIN1, AIN2, AOUT1, AOUT2 emanating from the Telephony Control IC 13. The digitized signals are transported to/from the Computing Processor 14 via a multiplexed digital data stream, such as a PCM stream bus, familiar to one skilled in the art.

Computing Processor 14; This element represents the digital control processor unit for execution of the main apparatus application firmware. It can consist of appropriate microprocessor and/or DSP processing devices as is required, and known by one skilled in the art. The Computing Processor 14 runs the application software resident in the Memory Subsystem 17. When 5V (or as otherwise appropriate) power from the main power rail is present, the Computing Processor 14 controls the whole operation of the Telephone Set 200.

A key element is that the Computing Processor 20 requires sufficient computing power and appropriate software algorithms to process these audio signals. These capabilities include the following:-flexible audio frequency band tone (and multi-tone) generation and detection capabilities. This is used for such items as DTMF tone detection and generation, caller-id (and call-waiting id), Frequency Shift Keying (FSK) signal detection, and various other common telephony tone signaling activities:

- when audio to/from the FXO and/or speakerphone transducers is transported across the LAN Interface 15, algorithms are required to perform appropriate line and/or acoustic echo cancellation within Telephone Set 200. The design parameters around these echo cancellers are well known, and are their performance criteria is well described in the International Telecommunications Union (ITU) G.168 standard.
- ability to handle multiple independent instances of playing and recording audio data from/to the Memory Subsystem 17.
- flexible audio gain control is required for all audio paths. This would include audio muting and automatic gain control circuits as needed.
- flexible audio mixing, and if desired, audio conferencing control of various audio output and input paths. The audio mixing capabilities facilitate call recording and call monitoring capabilities. The mixing/conferencing with audio paths to/from the Telephony Control IC 13 analog audio switch matrix, and one or more call sources to/from the LAN network.

Memory Subsystem 17; This element provides all of the volatile and nonvolatile memory storage for the application software, data and algorithms, as required for any devices as part of the Computing Processor 14. Examples of this memory storage are flash memory, SDRAM memory, EEROM and are well known to one skilled in the art. The application software and algorithms contain all the functions to perform the necessary TCP/IP and VoIP protocol stacks such as TCP, User Datagram Protocol (UDP), Real-time Transport Protocol (RTP), SIP, Simple Mail Transport Protocol (SMTP), Hypertext Transfer Protocol (HTTP), File Transfer Protocol (FTP), and Trivial File Transfer Protocol (TFTP).

LAN Interface 15; This element provides the Ethernet 802.3 interface, which includes the media access controller (MAC) and physical interface (PHY).

Display and Indicators 16; This element represents common telephone items such as indicator LEDs, LCD display, buttons. The interconnections of such are well known to one skilled in the art.

Telephone Set 200 Suggested Off-the-Shelf Integrated Circuits

The key elements of Telephone Set 200 can be build by using "off-the-shelf" integrated circuits. To aid one skilled in the art to rapidly be able to put in place most of these key elements, one could recommend the following commercial integrated circuits:

Broadcom™ BCM1101 VoIP Processor. This IC effectively provides the functionality of the Computing Processor 14, Dual A-D Converters 78 and LAN Interface 15. It typically is also sold with many of the requisite microprocessor and DSP software protocols and algorithms required.

Atmel™ U3900BM Telephony Processor. This IC effectively provides functionality of the FXO Circuit 10 and Telephone Control IC 13.

Atmel™ AT90S8515 AVR Microcontroller. This IC effectively provides functionality of the Microcontroller 11 and 5V Power Comparator 75.

Manufacturer datasheets and application notes relating to the above integrated circuits give an abundance of information of technical information as to the operation and recommended design considerations to allow one skilled in the art to be able to replicate many of the key elements of Telephone Set 200.

VoIP Protocols Operational Description

For the purposes of this patent description, we will describe the VoIP protocol functionalities of the Telephone System 100 and Telephone Set 200 with respect to the usage of the SIP and RTP protocols. For example, it is well understood by one skilled in the art that digitized audio data is transported across the LAN Interface via the RTP protocol, and call setup and control information is transported across the LAN Interface 15 via the SIP protocol. The IETF reference document that explains the SIP and RTP protocols can be found in RFC 3261 and RFC 3550 respectively.

The following is an illustrative example, with regards to VoIP protocol operation of the Telephone Set 200.

When the incoming Public Switched Telephone Network (PSTN) call arrives at the telephone line, it generates a ringing signal. Via the FXO Circuit 10 and the Telephony Control IC 12, the Microcontroller-11 is notified that the line is ringing, and if available, would be notified of any caller identification information. It relays this status information to the Computing Processor 14 via a UART message.

The Computing Processor 14 can now initiate a SIP call to one or more other Telephone Set 200 devices (including itself on the LAN/WAN Network 6 by sending out the appropriate SIP INVITE messages to the other Telephone Set 200 devices. If the Computing Processor 14 receives a SIP OK message from a Telephone Set 200 via the LAN/WAN Network 6, it can proceed to set up the call by sending message(s) to the Microcontroller 11 to take the FXO Circuit 10 to an off-hook state, and to route the FXO_RX and FXO_TX audio signals through the Telephony Control IC switch matrix to the AIN1 and AOUT1 audio paths. This connected audio can pass through one channel of the Dual A-D Converters 86 and the digitized audio is transported via the LAN Interface 15 via the RTP protocol to the other Telephone Set 200 on the LAN/WAN Network 6. Now a complete call path is in session between the FXO Circuit 10, and another Telephone Set 200 on the LAN/WAN Network 6.

At the same time, an appropriate SIP INVITE message can be received at the same Telephone Set 200 via the LAN Interface 15. The Computing Processor 14 can send a message via the UART to Microcontroller 11 to alert the human user of Telephone Set 200 via an audible alerting signal that an incoming call from another Telephone Set 200 is available. The Microcontroller 11 can detect when the user picks up the handset (or activates a speakerphone key press), and send this status information via the UART to the Computing Processor 14. The Computing Processor 14 can now send a SIP OK message to the calling Telephone Set 200 on the LAN/WAN Network 6.

The Computing Processor 14 proceeds to send message(s) to the Microcontroller 11 to route the appropriate Audio Transducers 12 audio signals through the Telephony Control IC switch matrix to the AIN2 and AOUT2 audio paths. This connected audio can pass through the second channel of the Dual A-D Converters 86 and the digitized audio is transported via the LAN Interface 15 via the RTP protocol to the other Telephone Set 200 on the LAN/WAN Network 6. Now a complete call path is in session between the human user, and another Telephone Set 200 on the LAN/WAN Network 6.

It is important to note that the call from the FXO Circuit 10, and the call answered by the human user are independent of each other. That is, the Telephone Set 200 can simultaneously perform an independent SIP call session on the FXO Circuit 10, and another independent SIP call session using the Audio Transducers 12. This is not the case with the prior art of VoIP phones that contained a FXO port.

To one skilled in the art, it is apparent how outgoing and incoming FXO calls can occur, or how a human user could also initiate and receive a call, and how these calls would be terminated. It is also possible for the incoming FXO call to have been answered by a human user on the same Telephone Set 200 device.

Server-Less VoIP Telephone System Operation

In a preferred embodiment the inventive VoIP Telephone System 100, each Telephone Set 200 communicates, via its LAN Interface 15, to other devices using peer-to-peer TCP/IP communication protocols. Each LAN connection 3-1 through 3-N for each Telephone Set 200 device could be on different LAN or WAN segments, different TCP/IP networking equipment, and finally, located across both small and large geographical distances. Unlike the prior art using the RF communication method, this communication path is not along a common, shared RF communication path, but rather across distributed and network addressable path, the LAN/WAN Network 6.

This has the major advantage over prior art RF communication methods, for it overcomes the aforementioned disadvantages of RF channel capacity, line REN limits, and shared telephone line cable lengths and terminations. In addition, when a power fail situation occurs, each Telephone Set 200 device can provide basic ability to make and receive phone calls on any unique analog loop-start lines routed to the FXO port of such Telephone Set—200. This is unlike prior art where power fail operation was limited to only the one shared loop-start line, or relied on the usage of additional regular POTS phones connected on the analog loop-start lines. This provides numerous end user safety and convenience advantages for a business experiencing a power fail or LAN outage.

Another key advantage is that Telephone Set 200 devices could be deployed across a potentially very large geographical distance via the LAN/WAN Network 6, limited only by the capability of the WAN. For example an office could have several Telephone Set—200 devices on their customer premises, and other Telephone Set 200 devices located in different towns, cities and even countries. This is a capability not found in the prior art.

In accordance with the principles of the invention, the elements shown in FIG. 1, i.e., Telephone Sets 2-1 to 2-N communicate to each other over the LAN/WAN Network 6 in a peer-to-peer manner. In other words, there is no centralized server coordinating the actions of each telephone set. Each Telephone Set 200 comprises its own system and call processing software. As described further below, Telephone System 100 is self-configurable. The system accomplishes this by allowing each Telephone Set 200 to supply specific information and capabilities about themselves to other Telephone Set 200 devices upon request.

In addition, each Telephone Set 200 can subscribe to receive notifications of changes in resource status of other Telephone Set 200 devices in the system. As a result, Telephone System 100 provides plug-and-play functionality. Examples of system resources are: intercom number, voice channels, FXO line capabilities, voice messaging services, etc. Examples of changes in resource status include whether not a FXO port(s) is presently in use, whether a user is actively using a Telephone Set device, information on various intermediate states of a resource (e.g. ringing, on-hold, idle, do-not-disturb, and similar reports).

Upon initialization, each Telephone Set 200 goes through various discovery stages about the telephone system available on the LAN/WAN environment. The end result of these stages is that the system is capable of discovering other Telephone Set 200 devices, and gathers enough information from those devices to be able to self-organize into an operating VoIP telephone system. This includes auto-assignments of intercom extension numbers, knowledge of available external analog loop-start lines, availability of system voice messaging features. During this stage, it may prompt the user for further information depending on how successful it was in determining its external environment.

Figure 8:
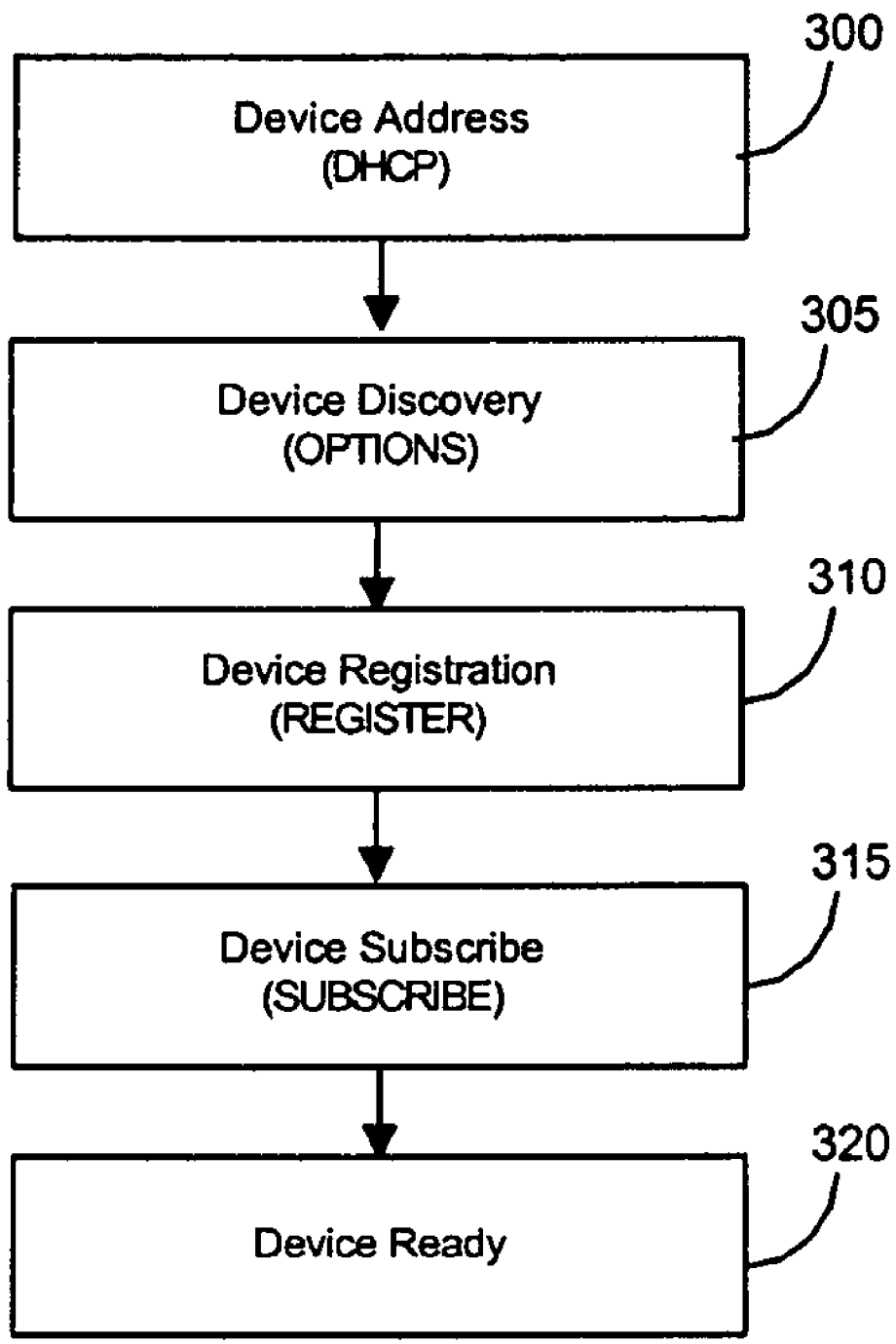
FIG. 8 shows an illustrative method for a typical device initialization and discovery sequences.

For illustrative purposes, FIG. 8 shows the various stages involved. Below describes one implementation of these discovery stages. Various alternative methodologies would be obvious to one skilled in the art. For illustrative purposes only, description of these stages refers to commonly defined usage of the Internet and SIP protocols.

The first stage 300 is called Device Address. The first action of the Telephone Set 200 is to determine an IP address for itself. By default the Telephone Set 200 uses Dynamic Host Configuration Protocol (DHCP) to obtain a dynamically assigned IP address from a DHCP server on the LAN network. Alternatively, the telephone set could be configured a static IP address, as is common for VoIP telephone sets. All other basic telephone set initializations occurs during this stage.

The second stage 305 is called Device Discovery. Using common broadcast, unicast and/or multicast techniques familiar to one skilled in the art, the Telephone Set 200 attempts to determine whether or not it is in a different LAN network. If it is in a different LAN network environment from when it was last powered, or LAN cable was unplugged and reinserted, or if it is the first time the Telephone Set 200 has ever been initialized, the Telephone Set 200 will attempt to discover the basic presence of other like Telephone Set—200 devices on its local LAN environment.

For illustrative purposes only, this discovery can occur by the initializing Telephone Set 200 sending out a broadcast SIP OPTIONS message to its local LAN segment. A broadcast message is illustrated only because many small business establishments typically have low-end routers that may not support multicast, or require special network administration skills. It can also send unicast or multicast SIP OPTIONS messages to devices on the WAN. Familiar to one skilled in the art, recipients of the SIP OPTIONS message will send back a message indicating information and capabilities of the recipient device. This allows the Telephone Set 200 to, first of all, know what devices are on the network, and secondly, determine the capabilities of the responding Telephone Set 200 devices. The initializing Telephone Set 200 can then make a decision as whether or not this capability is of interest. As the state of the art changes, alternative discovery protocols such as uPnP and zeroconf may become appropriate alternative discovery methods and this invention is thus not limited to SIP.

This stage is also important for any responding Telephone Set 200, for it is now aware that the initializing Telephone Set 200 is present on the network. For example, it is common for the reply message to have a "User-Agent" field. This field could indicate that the device represents a Telephone Set 200, and possibly have extra specific information about the device. This is for illustration purposes only, for the device discovery methods using SIP protocols are still in flux.

Pertinent information about this stage 305 is stored locally in non-volatile memory storage area on the Telephone Set 200. This system information includes, at a minimum, what Telephone Set 200 devices types were discovered, their IP addresses, and for Telephone Set 200 devices, their assigned intercom number.

If the Telephone Set 200 determines that it is in a different LAN network, then the Telephone Set 200 reconfirms and updates the system information that is stored in the Telephone Set 200 non-volatile memory storage area (data store). Any newly discovered Telephone Set 200 devices are added to the data store. Any devices no longer present on the system are typically removed from the data store. The user may optionally be prompted to confirm this action. In certain situations their information may be delayed in removal by an appropriate aging algorithm. This is to prevent inadvertent re-assignment of intercom numbers if another previously discovered Telephone Set 200 device is off-line (not present) in the system for a short duration. This duration might typically be 15 days or less, or this duration could be determined by an administrative setting.

System information as described above is discovered automatically. This system information can be augmented by fixed information entered into the Telephone Set—200 via a local or remote administration service. This allows the inventive phone system to accommodate devices that cannot be located by the System Discover stage, and to support third-party VoIP devices or services. These administrative methods are known to those skilled in the art. They would include administration settings accessed with the telephone set keypad and LCD display, or by processing appropriate messages received on the LAN Interface 15, or by any other known programming interface.

The next stage 310 is called Device Registration. In this stage, the Telephone Set 200 attempts to register itself to each of the other Telephone Set 200 devices in the system, using the SIP REGISTER method. The other Telephone Set 200 devices can either accept or reject this registration attempt. If a Telephone Set 200 rejects a registration attempt, it just means that our Telephone Set 200 cannot take advantage of the resources or services of the rejecting Telephone Set 200.

If it is of interest, the Telephone Set 200 has the option, now, or at a later time, to go to the stage 315, called Device Subscribe. Using the SIP SUBSCRIBE method, the Telephone Set 200 can subscribe to one or more asynchronous event notifications from other Telephone Set 200 devices available on the network. The subscribed Telephone Set—200 delivers these to the subscriber via the SIP NOTIFY method.

The SUBSCRIBE and NOTIFY are important mechanisms to allow a Telephone Set 200 to receive notification from another Telephone Set 200 indicating pertinent status information such as FXO port being in use, if the set is in use by a human user, or do not disturb settings. This allows the Telephone System 100 as a whole to deliver common expected features such as FXO line and set indicators. Again, this information is delivered to each Telephone Set 200 from an individual Telephone Set 200 and not coordinated by a central control server. The IETF reference document that explains these SIP methods can be found in RFC 3265.

Beyond stage 315, the Telephone Set 200 moves to stage 320, called the Device Ready state. Here the Telephone Set 200 is ready to operate and participate in the system. It is noted that other Telephone Set 200 devices may do the same stages 305, 310 and 315 against this Telephone Set 200, such that they can take advantage of the resources and capabilities of the newly initialized Telephone Set 200.

From the Telephone Set 200 perspective, it is now aware of other Telephone Set 200 devices on the network. It is also aware of the availability of FXO port(s), if any, on the network. To make use of these system resources, the Telephone Set 200 would make use of various SIP messages such as INVITE, OPTIONS, SUBSCRIBE and NOTIFY messages to know the status and/or current capabilities of the specific system resource, and request the usage of that system resource. Calls to/from the Telephone Set 200 can occur using known SIP INVITE methods. The Telephone Set 200 device can handle independent SIP sessions for use of its FXO port(s), if available, and also for the use of the device transducers. Using SIP messaging, the ability of a system resource to accept or reject a SIP request method are known to one skilled in the art.

To stay aware of any dynamic changes in the network, and hence the phone system, the Telephone Set 200 periodically repeats Stage 305 to determine if there are changes in the Telephone System 100. (i.e. Telephone Set 200 devices added, removed, changed). It is suggested that this Stage 305 is repeated at intervals of 2 minutes or less to be responsive to the changes.

In the inventive Telephone System 100, a Telephone Set 200 require the capability of performing a technique called SIP INVITE parallel forking, referred subsequently as forking, and is known to one familiar with the art. This is a feature commonly available from a TCP/IP protocol telephone system with a centrally control server. Within this central server, this forking capability is commonly provided by what is called a proxy server software component.

But since a centrally control server is not part of the inventive system, the Telephone Set 200 devices themselves require this capability. Forking is a key requirement to handle typical multi-line phone system scenarios. SIP INVITE messages are the foundation for establishing a VoIP communication session with another device. Recipient devices will either accept (SIP OK response) or reject (SIP non-OK response) the INVITE. If a device wants to, it can INVITE multiple devices to a session at the same time. This is forking, and the device typically accepts the first device that responds with an OK response, and cancel (SIP CANCEL and/or BYE messages) to any of the other responding devices.

For illustrative purposes, the following is a description of one instance where forking is required. When a Telephone Set 200 device receives an incoming call on its FXO port, it will generally want to alert (ring), all other Telephone Set 200 devices in the system. It does this by forking (sending SIP INVITE message) to all the Telephone Set 200 devices. The Telephone Set 200 handles the forking process, and will route the FXO voice call to the first Telephone Set 200 device that responds with an OK response. By default, all of the Telephone Set 200 devices in the system would be forked to, but it could be a subset of this, depending on various user-defined parameters such as caller-id information, time/date, and Telephone Set states.

Another illustrative example of where forking is required is for when an external SIP call originates from the WAN. The WAN device that originated the call generally may not know the specific IP address of a Telephone Set 200 because of NAT/Firewall (router) issues. The incoming SIP call would be "port forwarded" by the router to a Telephone Set 200 that is designated to act as recipient for external WAN SIP calls. When the designated Telephone Set 200 device receives an incoming SIP call on its LAN Interface 15, it will resolve the SIP URI to determine the actual intended Telephone Set 200 device(s). It will generally want to alert (ring), all other Telephone Set 200 devices in the system. It does this by forking (sending SIP INVITE message) to all (or a subset of) the Telephone Set 200 devices. The designated Telephone Set 200 handles the forking process, and will route the WAN SIP call to the first Telephone Set 200 device that responds with an OK response. This forking process is familiar to one skilled in the art.

Each Telephone Set 200 device in the system needs to share and maintain appropriate common system data current amongst all of the Telephone Set 200 devices. In the spirit of the inventive system, the devices would co-operatively share this information amongst themselves by sending/receiving messages across the LAN/WAN Network 6. Many methods to do this are familiar to one skilled in the art. Naturally one needs to take necessary steps to ensure the validity and integrity of this shared data.

It should be noted that the inventive Telephone System 100 provides non-blocking operation of intercom calls between Telephone Set 200 devices. This means that any Telephone Set 200, at any time, can perform an intercom call to any other Telephone Set 200. This is a strong advantage to prior art RF-based telephone system implementations, whereby the number of simultaneous intercom calls across the common communications channel in the overall telephone system was limited by the RF-channel capacity of the telephone system.

Telephone Set 200 Voice Messaging Capabilities

The Telephone Set 200 alone also has several inventive methods with respect to built-in advanced voice messaging capabilities.

The first inventive method regarding advanced voice messaging capabilities of the Telephone Set 200 is the ability to perform complete call recording capabilities when on an active call. The Telephone Set 200 can support two methods of call recording. One method is called "store-forward", the second method is called "real-time" recording. The initiation of the call recording can be started by the user pressing a button on the Telephone Set device, or could be initiated by other system defined parameters, such as caller-id, time of day and user status. Also, the call recording can be started and stopped at any time during the conversation. In addition, the device could be setup such that all calls are recorded, without any user intervention. This can be done by an administrative setting in the Telephone Set, or the recording process can be controlled via appropriate SIP message requests received from the LAN Interface 15.

Figure 9:
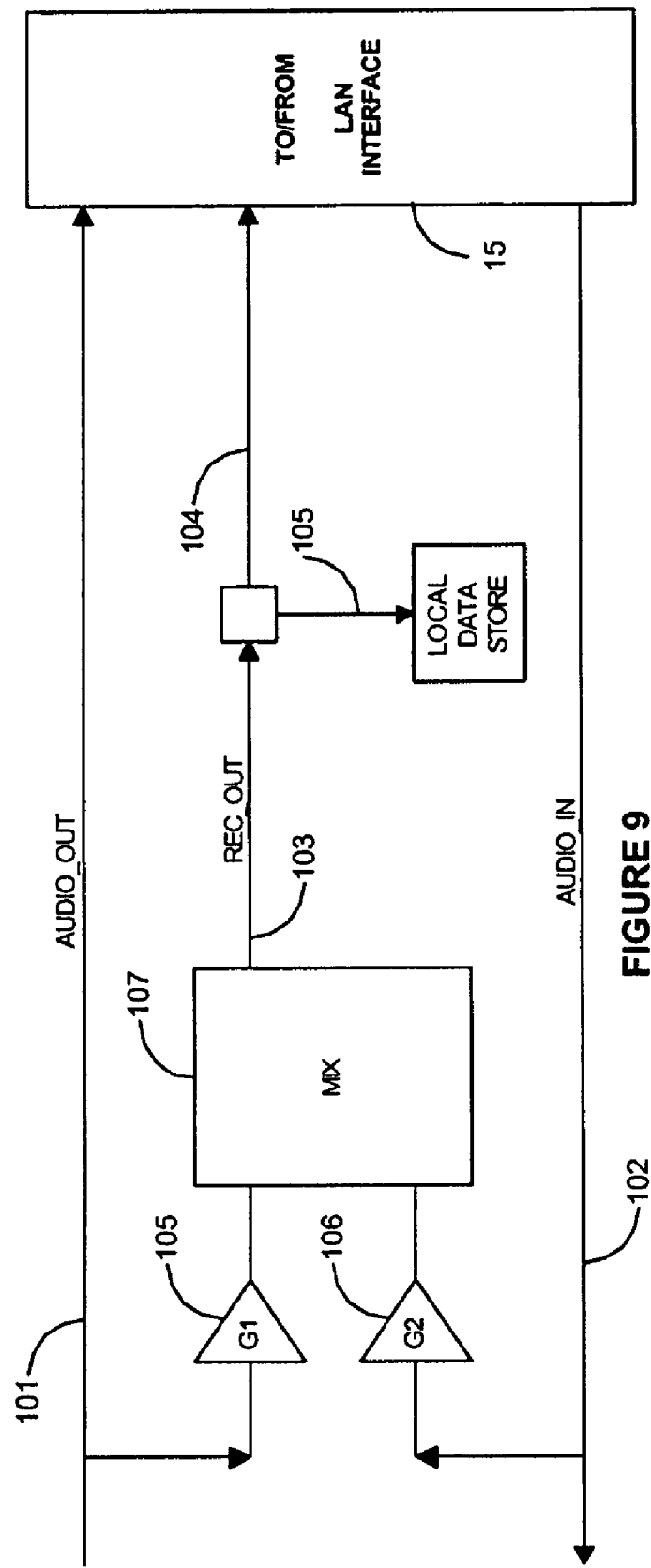
FIG. 9 shows a illustrative block diagram of a the call recording mechanism of Telephone Set 200.

An illustrative diagram of the inventive method is shown in FIG. 9. This is one possible method, but one skilled in the art could devise of variations of the method. A call transmit and receive audio paths are compromised of audio streams, as is known in the art. These audio streams AUDIO_OUT 101 and AUDIO_IN 102 can be mixed, to create a summed audio output REC_OUT 103. G1 105 and G2 106 represent gain control elements, such as variable gains and/or automatic gain controls that serve the purpose of equalizing the audio and receive transmit levels to produce a pleasing and useful summed audio output REC_OUT 103. This audio output REC_OUT 103 represents the recorded audio conversation.

REC_OUT 103 can be directed to the local data store (via 105) on the Telephone Set 200, and/or directed to the LAN Interface 15 (via 104). The former destination is used for "store-forward" method, and the latter destination is used for the "real-time" method, as explained in the next paragraph. The information would be sent on the LAN Interface 15 via one of several well known protocols (HTTP, SMTP, FTP, TFTP, SIP/RTP, and the like), or it could be done with a proprietary protocol. The destination for the recorded data would be any appropriate LAN device, on or off premises that would handle the recorded data in any way it deems appropriate.

For the "store-forward" method, the recorded call data is stored locally on the Telephone Set 200. It could be stored in a volatile or non-volatile memory area. With this method after the call recording is complete, the user can manipulate the recording (playback, edit, and/or delete). Finally, the user would have the option of forwarding the recorded data out of the device via the LAN Interface. This can be done programmatically to control future calls, or automated, as well.

A drawback of the "store-forward" method is that the Telephone Set 200 may not have enough local data storage memory capacity for the recorded message. This is especially true if the call conversation is of a very long duration. Hence, the desire for the "real-time" method. In this method, the recorded data is immediately directed out of the device via the LAN Interface as soon as call recording is started. An appropriate amount of data buffering will generally be required to handle network latency issues.

An illustrative example of this method is when a user receives a call. The caller may want to leave a message for another person in the office. Instead of the user being bothered to find pen and paper, the user can press the appropriate keys on the Telephone Set 200 to initiate the call recording action, and select a named user using the Telephone Set 200 directory. (A directory is a common element in telephone sets). This named user would be the recipient for this recorded message. Stored in the Telephone Set—200 data store is the named users e-mail address. Rather than a written note, the recipient in this example would receive the recorded call conversation as a voice file or audio capable file attachment to an e-mail. This e-mail message would be received in their e-mail client inbox. Alternatively, the message could be delivered to a voicemail system, and recipient could receive the message via normal voicemail mechanisms.

A related inventive method is that some protocols may have limits on the amount of data they can handle per session. This is a common limitation of e-mail for example, (SMTP) systems. The Telephone Set 200 can be configured such that it is aware of these limits, and without user intervention, it can close a session, and re-open another session. This can apply to both the "store-forward" and "real-time" methods. For example, if the Telephone Set 200 is using the SMTP protocol to send the recorded data as appropriate audio data file attachments, it may be aware that the e-mail system is limited to accepting only files less than one megabyte in size. At each one megabyte (or less) data boundary, the Telephone Set 200 would close the present SMTP session, and restart another one. This process would be repeated as long as call record data is still available. Sending the recorded audio in a series of related parts, each smaller than the relevant, expected or learned, data attachment size barrier. This makes the feature much more convenient and useful for the end user.

Figure 10:
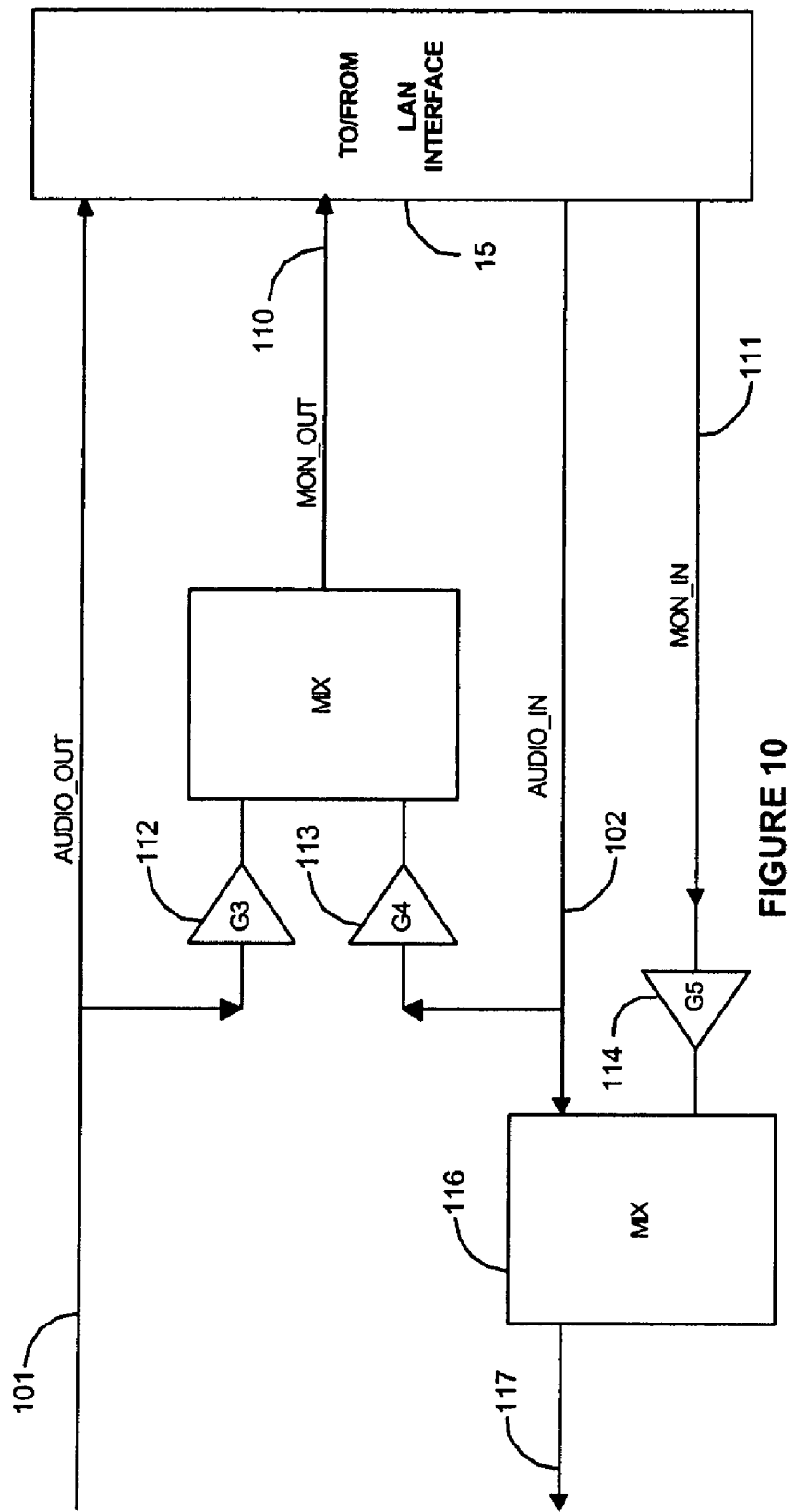
FIG. 10 shows a illustrative block diagram of a the call monitoring mechanism of Telephone Set 200.

Another inventive method regarding advanced voice messaging capabilities of the Telephone Set 200 is call monitoring capabilities when on an active call. This inventive method is significant, because previous prior art either did not have this capability, or required the interaction of the telephone set with other system devices such as a central server or conferencing device. This provides significant economic and deployment advantages for those market segments that require this capability. (e.g. the call center industry). This example of a call monitoring method uses use the "real-time" method described above. FIG. 10 shows, in a similar fashion to call recording, how the call conversation data stream MON_OUT 110 is created and directed out the LAN Interface. It also shows how a remote call monitoring agent can not only listen to the active call, but optionally discretely inject their voice (from MON_IN 111) to the monitored Telephone Set 200 user (but not to the caller). Gain control elements 112, 113 and 114 are used for the same purposes as recording. As is obvious, there are a number of permutations of interactions between groups of 3 or more connected persons on this system.

The following is one preferred method illustration of how a call monitoring agent would use this feature. A call monitoring agent who wants to monitor the call would activate this feature by initiating a SIP call (using SIP INVITE message) to the desired Telephone Set 200. The SIP URI would indicate that this is a call monitor request. The Telephone Set 200 would not audibly alert the user, and may not give any visual feedback to the user. The software in the Telephone Set 200 silently accepts or rejects the INVITE, depending on administrative settings in the Telephone Set 200. If accepted, a regular SIP/RTP session would be established, as is familiar to one skilled in the art. The monitoring agent would be listening to the call conversation of the Telephone Set 200, and the monitoring agent can discretely make comments to the local user of the Telephone Set 200. Other parties to the conversation would not hear comments by the call monitoring agent.

It is noted that call recording and call monitoring activities can be both active at the same time on the same Telephone Set device.

Figure 11:
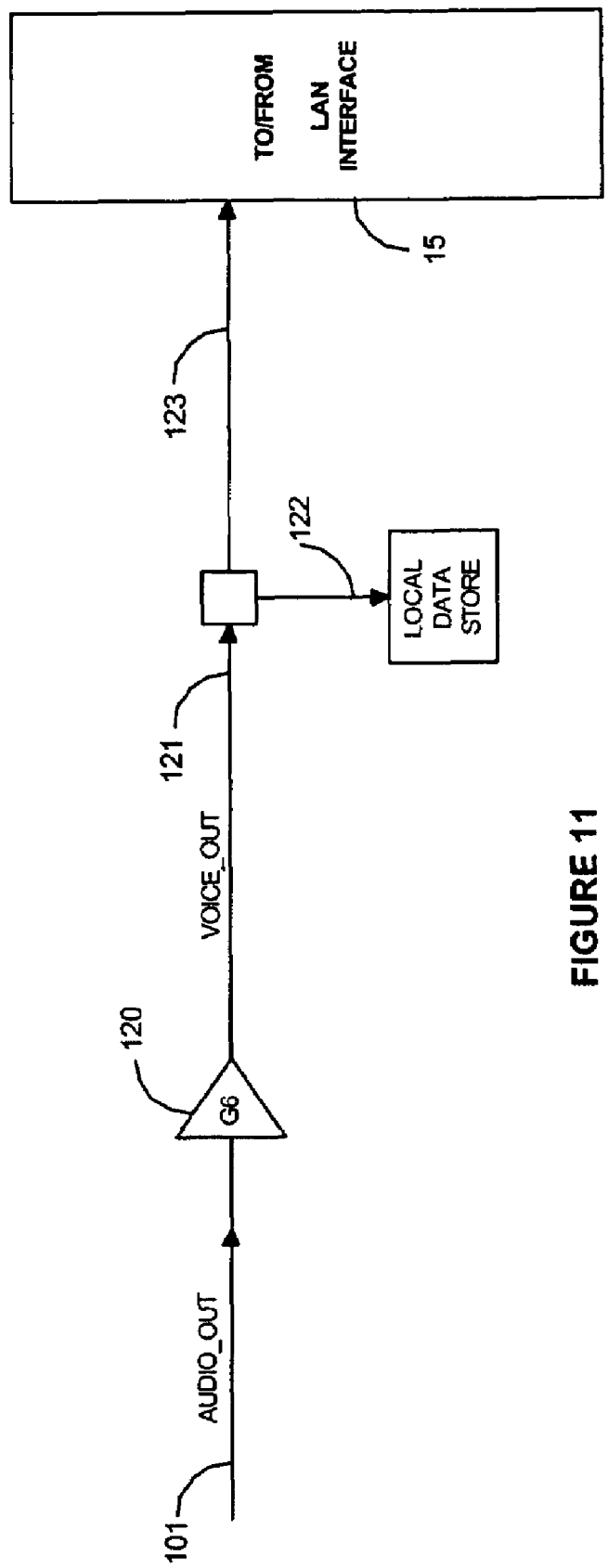
FIG. 11 shows a illustrative block diagram of a the voice (non-call) recording mechanism of Telephone Set 200.

Another inventive method regarding advanced voice messaging capabilities of the Telephone Set 200 is voice recording capabilities when the device is not on an active call. This capability would allow the user to record a voice message into the device, and direct that message outwards via the LAN Interface 15. This can be accomplished by the "store-forward" or "real-time" methods described above. FIG. 11 shows, in a similar fashion to call recording, how the recorded voice VOICE_OUT 121 is created and directed to the local data store (via 122), or directed out the LAN Interface 15 (via 123).

An illustrative example of this method is where a user wants to quickly deliver a message to other people. Instead of using a PC, and sending a regular e-mail, the user can record their voice message into the phone. Using the Telephone Set 200 directory, the user can select user(s) or groups to where this voice message would be externally delivered. By way of example, E-Mail (SMTP) would be a common delivery method. Recipients then could receive the message in their e-mail client inbox. Alternatively, the message could be delivered to a voicemail system, and recipients could receive the message via normal voicemail mechanisms.

Another inventive method regarding advanced voice messaging capabilities of the Telephone Set 200 is its optional ability to interface and manipulate directly with external LAN or WAN unified messaging storage services. Common to the art of unified messaging storage, an element of the art is a user having an option of handling their voicemail messages via their PC e-mail inbox, using the common POP3 or IMAP4 protocols. Conversely, the Telephone Set 200 could also handle the voicemail message. But with the prior art, the interaction with the POP3 or IMAP4 protocols are handled and coordinated by the central server. This inventive method refers to the Telephone Set 200 being able directly perform the POP3 or IMAP4 protocol interaction. The Telephone Set 200 would have appropriate protocol settings resident in the phone to become in some senses an e-mail client or a client of the unified message storage server (or both). These setting are entered by an appropriate administrative method.

An illustrative example of this method is where a user receives a voicemail message in their unified messaging storage server. They receive notification of this message in their e-mail inbox, or by their phone message-waiting lamp (or other methods such as stutter dial tone). If the user handles the message from the phone, the phone device will interact directly with the unified message storage server. If the user reviews the message, and deletes the message, the message will typically no longer appear in their e-mail inbox (assuming IMAP4 protocol is in use).

Telephone System 100 Voice Messaging Capabilities

Beyond the advanced messaging capabilities of the Telephone Set 200, the Telephone System 100 also has an inventive method with respect to providing advanced system-wide voice messaging capabilities with a multitude of Telephone Set 200 devices. Due to the many deficiencies and limitations of the prior art, commercial voice-message implementations proved to be dismal in providing capable business-quality telephone system voice messaging services.

An inventive method described following provides common business-quality voice messaging services, with the "plug and play" spirit of the system in mind. These methods relate to common voicemail/auto-attendant related features. Specifically, these are audio greetings, and "dial-by-name" feature. These features are familiar to one skilled in the art. The inventive methods relate to how these features are coordinated and delivered amongst a multitude of Telephone Set 200 devices. This does not preclude the Telephone System 100 operating with a conventional centralized voicemail/auto-attendant device or service.

The inventive method regarding advanced voice messaging capabilities of the Telephone System 200 is the appropriate sharing of audio greeting and operational configuration files between Telephone Set 200 devices. At a minimum, a typical voicemail/auto-attendant function requires audio greeting files such as welcome greetings, common system messages and individual user greetings. Configuration files would include such common functional information as time/date operating modes, number of rings before answering calls, caller-id matching settings and the like, to permit this type of configuration information is familiar to one skilled in the art.

As previously described, each Telephone Set 200 knows details about other Telephone Set 200 devices in the network. Each stores the network addresses, names, associated user names, intercom numbers and various capabilities of the others. Using this information, each device can retrieve individual user greetings, and the associated user data, and store this data locally on each the Telephone Set 200. By doing this, each Telephone Set 200 has the minimal capabilities to handle voicemail/auto-attendant capabilities servicing calls terminated on this device from the FXO port(s), or from the LAN/WAN network.

As an illustrative example, When each user sets up a Telephone Set 200, the user will be prompted to record a user greeting and the user could also record the main system greeting. This user greeting would be stored locally on the Telephone Set 200. In addition, the users are prompted to enter their full name (e.g. Bob Smith). Conversely, these greetings and information could be retrieved from a centralized configuration server.

Once a Telephone Set 200 is initialized, and in the Device Ready state (as described previously), then the Telephone Set 200, can proceed to retrieve the user greetings and user information from the other Telephone Set 200 devices in the system. Various protocols of transferring this information across the LAN Interfaces 15 can be used, such as TFTP, FTP, HTTP, SIP/RTP and SCP. The welcome greeting would be administered specially so that it can negotiate which greeting to use amongst the system. Methods would include allowing only one welcome greeting to be recorded in the system, using only the welcome greeting with the latest recording date, or retrieving the welcome greeting from a centralized configuration server.

Once the Telephone Set 200 has collected all the necessary greetings and information, it is now trivial to allow the device to competently perform voicemail/auto-attendant functions familiar to one skilled in the art. The Telephone Set 200 can handle voicemail/auto-attendant functions for calls received on the attached FXO Circuit 10, or via the LAN/WAN Network 6. Having the information resident in each Telephone Set 200 allows the Telephone System 100 to independently handle voicemail/auto-attendant functions even if another user's Telephone Set 200 is then off-line for any reason. This provides robust and reliable (non-centralized) system operation.

The recorded voicemail message could be handled by any of Telephone Set—200 devices in Telephone System 100. Various methods of delivering the recorded voicemail message to the intended recipient(s) are possible. For illustrative purposes, the voicemail messages can be sent to the recipient via e-mail methods (e-mail method), where the recipient can receive the message in an assigned e-mail inbox. Alternatively (or in addition), the voice mail message can be transferred directly (transfer method) to the intended recipient's actual Telephone Set 200. This transfer could use various LAN protocols such as TFTP, FTP, HTTP, SIP/RTP and SCP. The recipient could listen to the voicemail message on the recipient's Telephone Set 200 in the usual manner. The e-mail method is attractive, especially if the Telephone Set 200 has limited amounts of memory storage.

A combination of the e-mail and transfer methods is attractive. The following is an illustrative example. If the transfer method is used, the user can manipulate the voicemail on the Telephone Set 200 in the usual manner, such as navigating through key and LCD display prompts and listen using the Telephone Set 200 handset or speaker. At this time the user can listen to the message, delete it, or have the option of forwarding the message to the user's (or other) e-mail addresses. An administrative setting in the Telephone Set 200 could also automatically e-mail the message to pre-determined addresses under various scenarios. These could include scenarios such as if the local storage is full, or based upon time/date/holiday and caller identification settings and some simple (or complex) rules.

The e-mail addresses of possible recipients can be known by various methods. One method is when a user can enter in a Telephone Set 200 by administrative methods that use actual name and user e-mail address. This information is then shared with other Telephone Set 200 devices in the Telephone System 100. Alternatively, the Telephone Set 200 can interact with a central user information server, such as a LDAP server. For example, for one skilled in Lightweight Directory Access Protocol (LDAP) servers, one can retrieve information such as e-mail address associated with a user.

The voice messaging capabilities of Telephone System 100 are significant, for they can deliver advanced capabilities using only one or more Telephone Set 200 devices. This provides significant cost and complexity advantages for the end customers who want advanced voice messaging capabilities.

ADDITIONAL EMBODIMENTS

An additional embodiment of Telephone System 100 as represented in FIG. 1, is that each Telephone Set 200 does not necessarily need to have a telephone line connected to its FXO Circuit 10. The Telephone System 100 still works normally. When the specific Telephone Set 200 is queried by a SIP OPTIONS method, it can simple indicate that there is no FXO port resource available.

This notion leads to additional embodiments of Telephone Set 200. Additional embodiments of Telephone Set 200 could have no FXO circuit, but it could also have multiple FXO circuits. Again, the SIP OPTIONS query would make this resource information known to the Telephone System 100.

An additional embodiment of Telephone Set 200 is one that uses different physical LAN interfaces such as wireless interfaces (802.11) or different wired interfaces such as emerging higher speed LAN interfaces or optical LAN interfaces.

An additional embodiment of Telephone Set 200 is one that is created solely as a softphone, running on a PC or a handheld device.

But in the spirit of the invention, these additional embodiments of Telephone Set 200 would have appropriate software to participate in the inventive Telephone System—100.

An additional embodiment of Telephone System 100 is one that uses alternative LAN protocols. To one skilled in the art, many imaginative alternative or new LAN protocols could be used to implement the inventive spirit of Telephone System 100.

ALTERNATIVE EMBODIMENTS

Figure 3:
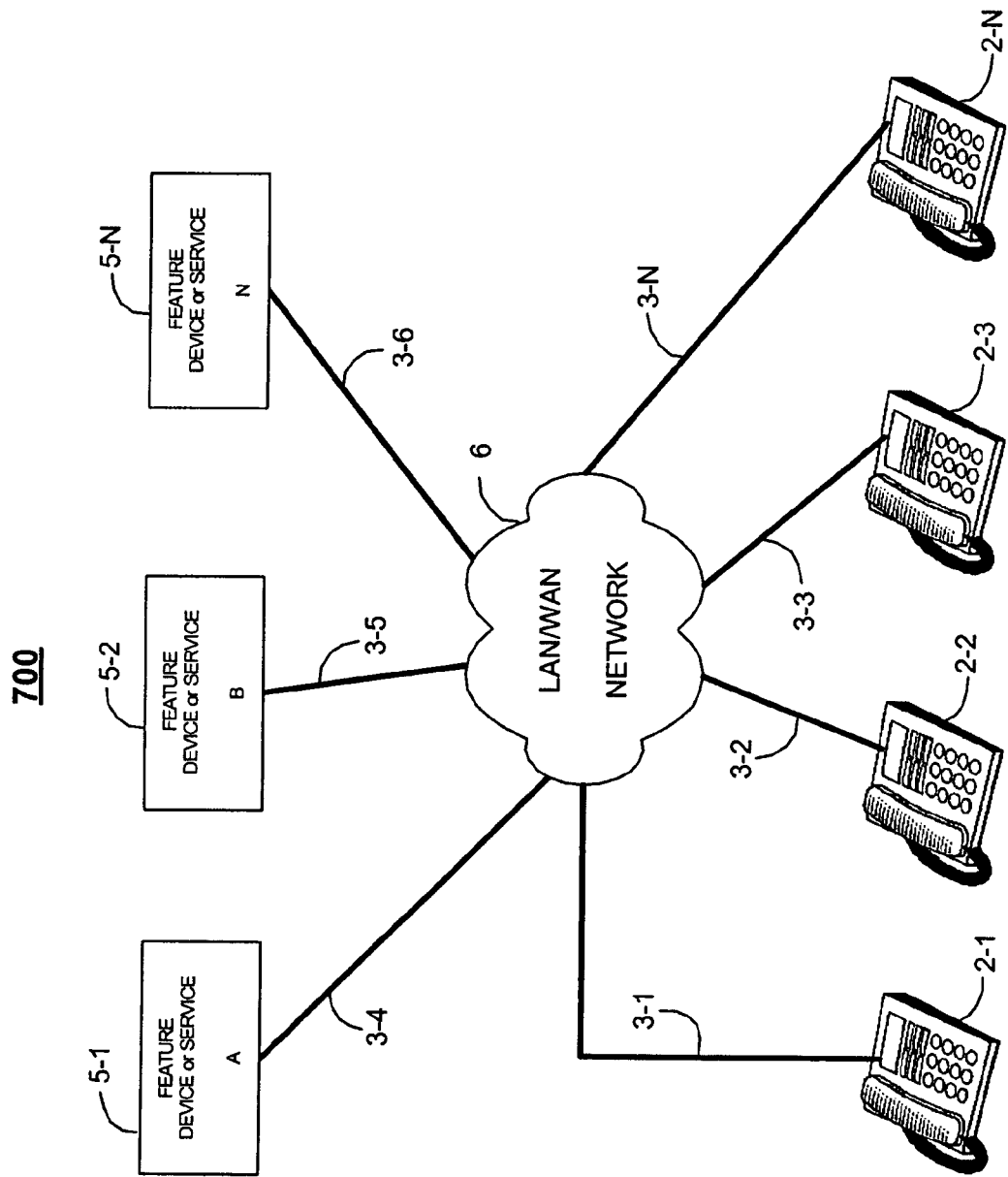
FIG. 3 shows a block diagram of an illustrative Telephone System 700.

In the server-less and "plug and play" spirit of the Telephone System 100 there are many imaginative alternative embodiments of this invention. FIG. 3 shows an example of an alternative embodiment. In this Telephone System 700, any combination of Feature Device or Service 5-1 through to 5-N would be part of the telephone system. Telephone Set 2-1 through 2-N are shown without analog telephone lines connected, but this does not need to be the case. Telephone Set 2-1 through 2-N are optional in Telephone System 700, for call devices could be provided from other means such as PCs, cordless or wireless handset devices.

Figure 4:
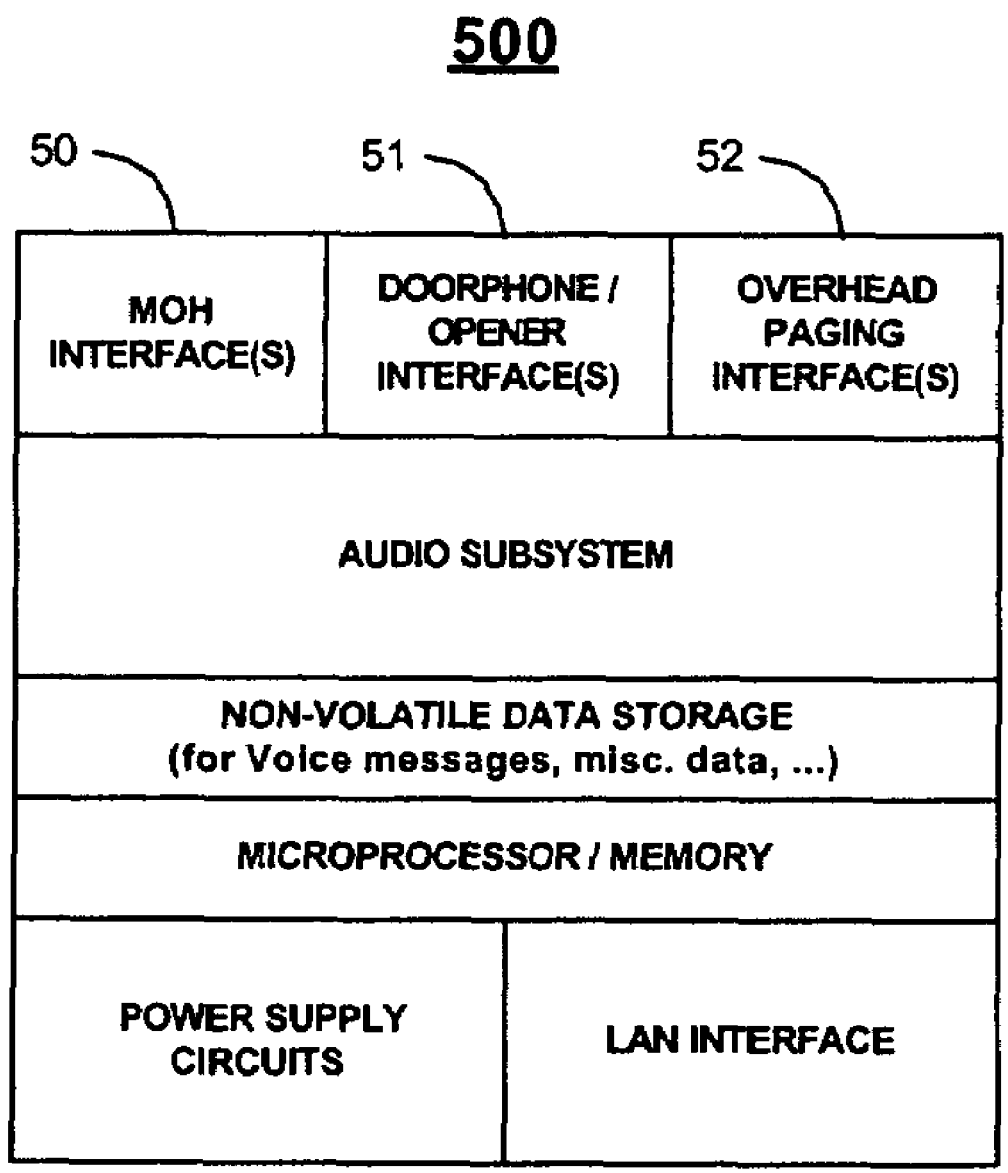
FIG. 4 shows a functional-level block diagram of a Voice Messaging 500 device.

An illustrative functional block diagram of an optional feature device is a Voice Messaging 200 device, as shown in FIG. 4. It is a device that could provide centralized voicemail, autoattendant, IMAP4 unified voice mail server, music-on-hold (MOH), overhead paging, door opener and door phone functionality familiar to one skilled in the art. In addition to previously described components, it comprises of the following: a non-volatile data storage area 54 (for storage of configuration information, and voicemail and greeting messages); the MOH Interface(s) 50, Doorphone/Opener Interface(s) 51 and Overhead Paging Interface(s)—52 are familiar to one skilled in the art. Other than the inventive Telephone System concepts of the invention, the elements are well-known to one skilled in the art and will not be described in detail.

This alternative embodiment opens the concept that some of the advanced voice messaging capabilities resident in the Telephone Set 200 or Telephone System 100 can be partially or completely provided by the Voice Messaging 200 device. For example, having voicemail in a separate device can provide more cost effective mass storage of messages. In addition, this is a convenient device to provide the MOH, overhead paging and door opener/phone functionality. Voice messaging storage and access could also be provided as a third-party service available over the Internet.

Figure 5:
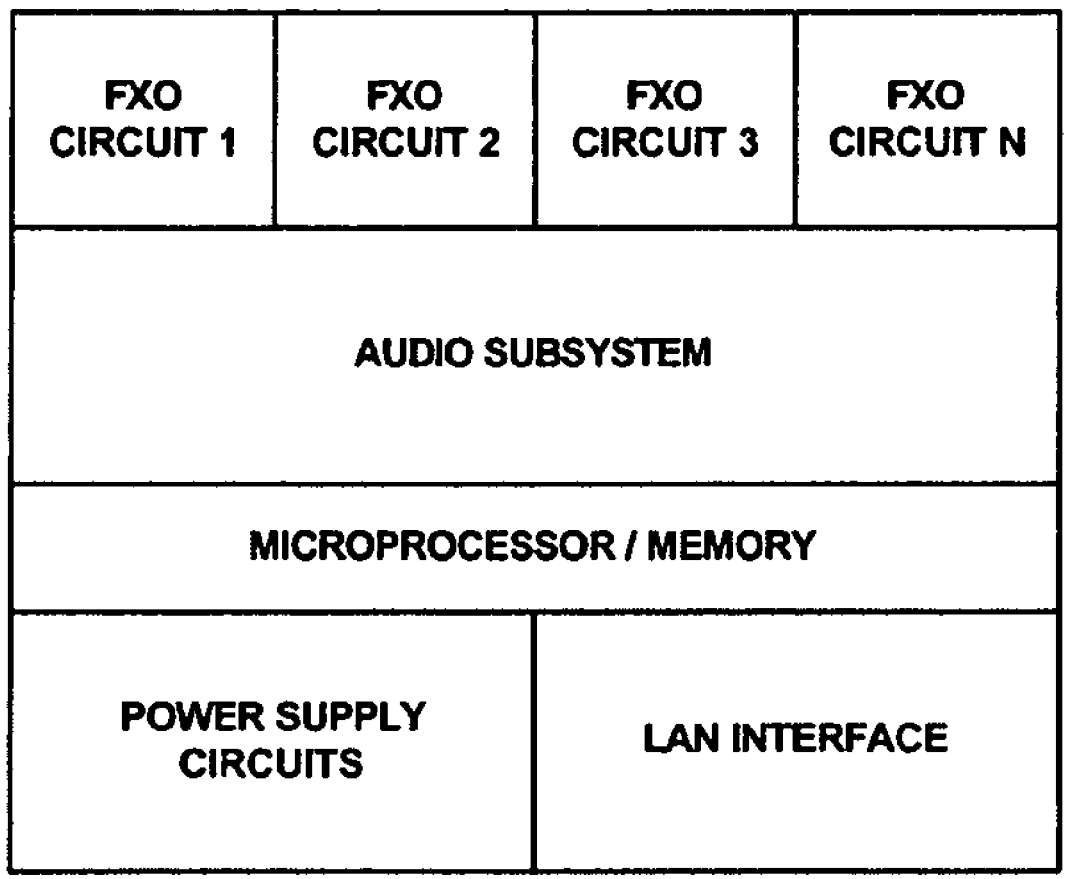
FIG. 5 shows a functional-level block diagram of a Multi-Port FXO Port 800 device.
Figure 6:
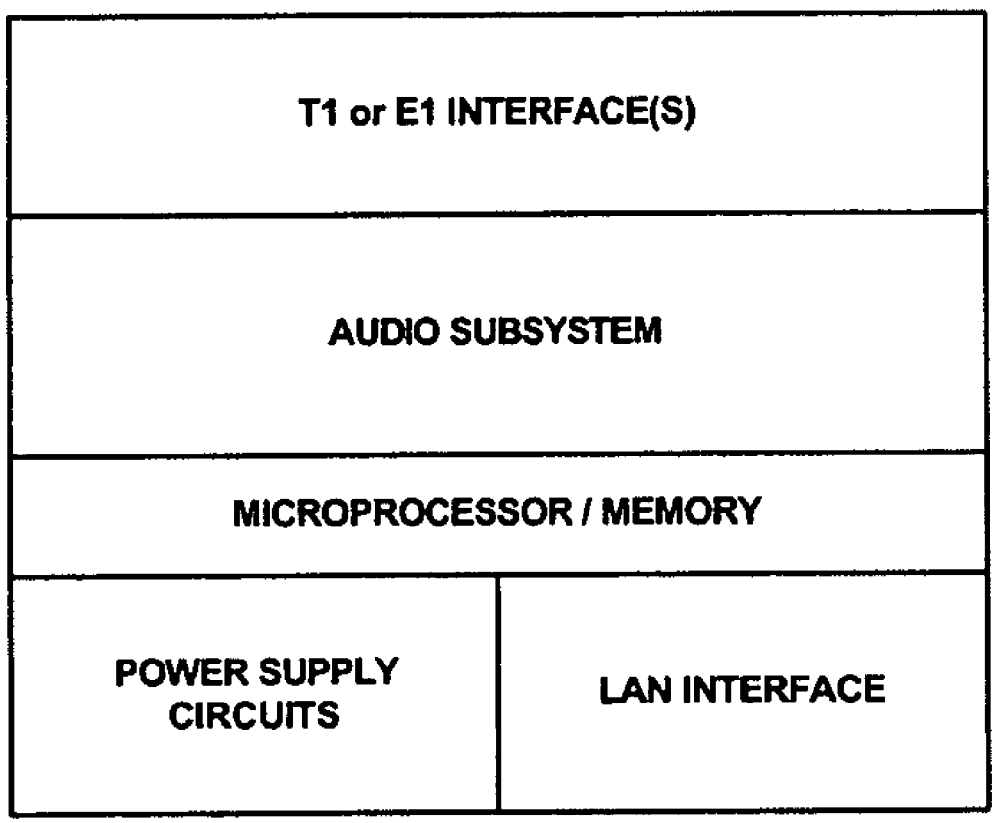
FIG. 6 shows a functional-level block diagram of a Ti/El Access 400 device.

Another illustrative functional block diagrams of other optional feature devices are a Multi-Port FXO 800 device and a T1/E1 Access 400 device, as shown in FIG. 5 and 6 respectively. These feature devices would provide additional PSTN access methods for the inventive telephone system. The Multi-Port FXO 800 device can alleviate the need to route an analog telephone line to a Telephone Set 200. This simplifies wiring in the office. The T1/E1 Access 400 device would allow the Telephone System 700 to expand greatly the PSTN access capabilities of the system. This is in contrast to prior art for a telephone system without central control, which was limited to accessing only FXO ports. As previously described for Telephone Set 200, whereby it performs forking upon reception of a incoming FXO call, these devices would perform the forking of incoming PSTN calls as is appropriate for the telephone system. The use of these devices may also be characterized as delivery of additional voice processing services over the system.

Figure 7:
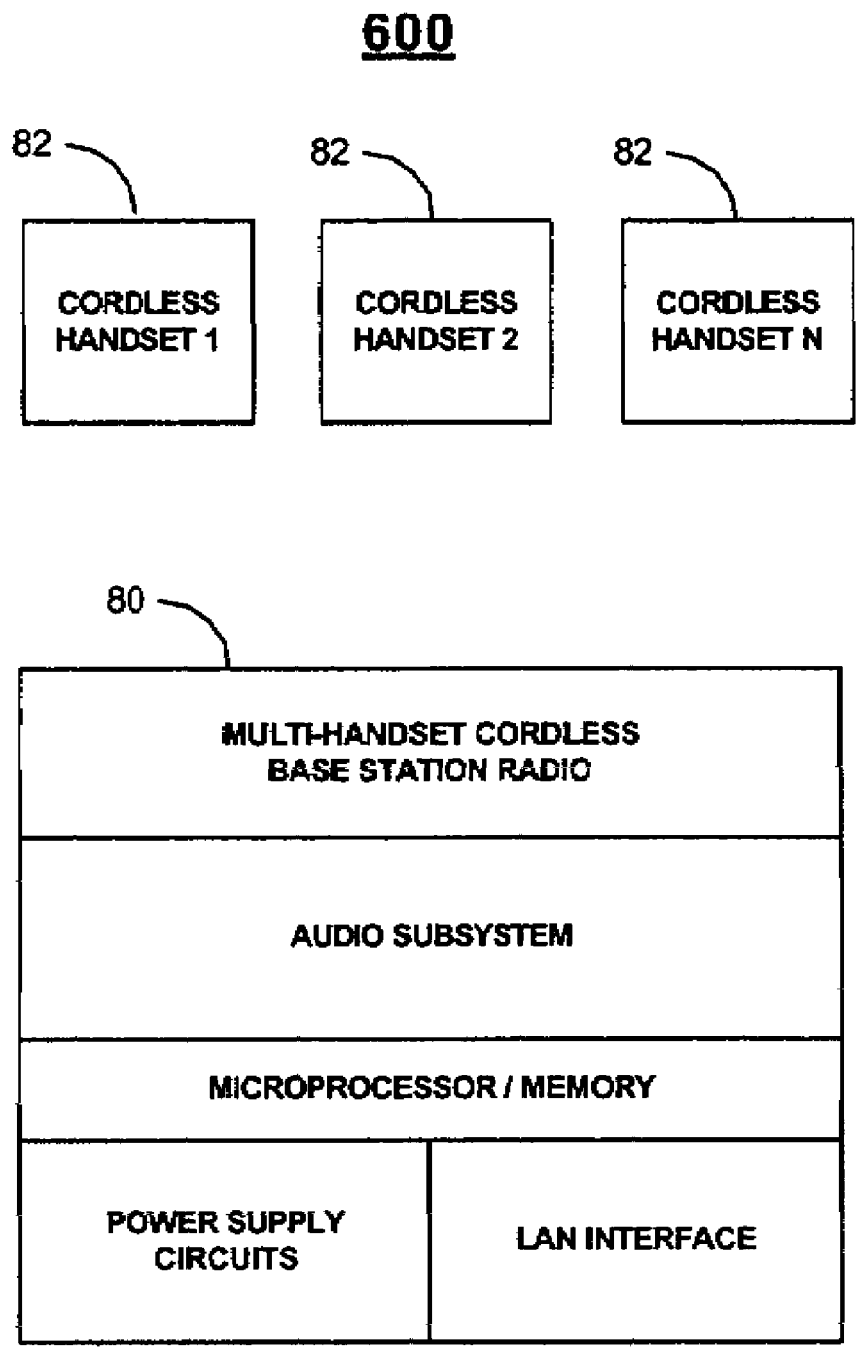
FIG. 7 shows a functional-level block diagram of Multi-Handset Cordless 600 devices.

An illustrative functional block diagram of another feature device is a Multi-Handset Cordless Base Station device 600, as shown in FIG. 7. The Multi-Handset Cordless Base Station Radio 80 handles the Cordless Handsets 82, as is known in the art. A multitude of Multi-Handset Cordless Base Station devices 600 could be present in the system, and coordinate handset roaming/handoff activities between each other by signaling appropriately over the LAN/WAN Network 6. The advantage of a device like this is to add cordless phone capabilities to the Telephone System 700. This can also be accomplished by having handset devices that operate directly on well-known 802.11 or Wi-Fi wireless technologies.

An illustrative example of another feature device would be a common office router that is enhanced with SIP proxy and registrar services. This could handle more gracefully the handling of incoming SIP calls originating from the WAN, without resorting to port forwarding. Devices in Telephone System 700 can register with this device, as usual, and then this device can handle the appropriate forking of incoming WAN SIP calls.

It is not out of the question for one to create a complex feature device that combines multiple features such as voice mail, autoattendant and PSTN access, or other functions. But within the spirit of the inventive telephone system, it would be an optional device, and the operation of the Telephone System 700 would not be wholly dependent on its presence. Some telephone system features may be missing of course, but basic functionality of telephone sets would be required.

There is also the concept of a Feature Service, such is commonly found out in the WAN environment (i.e. Internet). These services may not be able to be discovered automatically, but their location would be entered into any appropriate device by administrative methods known in the art. Examples of such feature services could include WAN PSTN calling services (DeltaThree, Net2Phone, . . . ), voice recognition services, centralized voice mail storage and retrieval services, and call conference services.

Again, the spirit of the invention of this telephone system, is that a Feature Device or Service 5-1 through to 5-N, such as the illustrative examples above, can go through similar system discovery methods described previously, and are not controlled by a central server, but are provided using the systems and methods of this invention.

Conclusion, Ramifications and Scope

In the basic embodiment of the inventive Telephone System 100, a full-featured phone system is created using solely one or more inventive Telephone Set 200—devices. In the basic Telephone System 100, multi-line PSTN and VoIP calls can be handled, and advanced voice messaging capabilities can be provided. There is no central control point in the inventive Telephone System 100. This system concept provides advantages to end users in being able to affordably scale down to offices as small as one user, and improves system reliability because there is no central point of failure.

To those skilled in the art to whom this description is addressed, it will be apparent that the embodiments previously described may be varied to meet particular specialized requirements without departing from the true spirit and scope of the invention disclosed. The previously described embodiments are thus not to be taken as indicative of the limits of the invention, but rather as exemplary structures thereof. Thus the scope of the invention should be determined by the filed claims and their legal equivalents, rather than by the examples given.

What is claimed is:

1. A voice over Internet Protocol ("VoIP") phone apparatus comprising:
   a. an FXO circuit attachable to an external POTS line and operatively connected to a Telephony Control IC and a Microcontroller, the FXO circuit providing Ringing and Status signals to the Telephony Control IC and generalized FXO-RX and FXO-TX signals to an Analog Audio Switch Matrix subcomponent of the Telephony Control IC;
   b. at least one Audio Transducer set comprising at least one microphone and at least one speaker operatively connected to the included Analog Audio Switch Matrix subcomponent of the Telephony Control IC;
   c. the Microcontroller operatively connected to a keypad, a Computing Processor, an electrical power source, and the Telephony Control IC, for providing and receiving control and state signals to and from the Telephony Control IC;

d. at least two A-D converter sets operatively connected to the Computing Processor for dealing with digitized audio signal I/O with said Computing Processor, providing matching analog signal I/O over two signal sets: AOUT1 and AIN1; AOUT2 and AIN2; with the Telephony Control IC; and e. said Computing Processor being equipped with a Memory Subsystem and Networks interface configured for communication with a LAN or WAN if connected, and a user interface comprising a display, input device and indicators.

2. The apparatus of claim 1 further comprising input power sources including at least power from a phone network and externally supplied electrical power, the apparatus further including sensing and switching means to provide power for the apparatus from the externally supplied electrical power when that source is available, but when the sensing means senses only power from the phone network available, switches power off to parts of the apparatus including the Computing Processor with its associated A-D convener sets, memory subsystem, Network interface, display and indicators, and wherein the sensing and switching means directs available power to the Telephony Control IC and other associated subcomponents of the apparatus, thus allowing the apparatus to become a minimal POTS telephone set when externally supplied electrical power is unavailable but power from the phone network is available.

3. The apparatus of claim 1, where the Computing Processor runs operating instructions programmed into the Memory Subsystem to control the operation of the apparatus, said Computing Processor and operating instructions including at least the following:

a. audio frequency tone generation and detection capabilities;

b. algorithms to perform appropriate line and acoustic echo cancellation; and c. software and algorithms containing programmable functions to perform IP and VoIP protocol stacks and programmable control of signal direction, processing, and communication between the various connected I/O devices, memory, LAN, WAN and telephone networks.

4. The apparatus of claim 3 further comprising a LAN interface capable of communication over a connected WAN.

5. The apparatus of claim 3 wherein the Computing Processor enables simultaneous playing and recording of audio data from and to the Memory Subsystem through at least one transducer set.

6. The apparatus of claim 3 wherein the Computing Processor enables variable and configurable capability for audio mixing to provide various combinations of audio input and output signals including one of the following: call conferencing, call joining, call recording and call monitoring functions.

7. The apparatus of claim 1 wherein the apparatus communicates via its Networks interface with other devices on a connected network using a packet switching communications protocol across a distributed and network-addressable path.

8. The apparatus of claim 7 wherein the apparatus is self configurable and responsive to network-available information about peer telephone devices on the network to enable each telephone device to share its resources.

* * * * *

UNITED STATES PATENT AND TRADEMARK OFFICE
CERTIFICATE OF CORRECTION

PATENT NO. : 7,599,355 B2  Page 1 of 1
APPLICATION NO. : 10/917814
DATED : October 6, 2009
INVENTOR(S) : Martin T. Sunstrum It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1360 days.

Signed and Sealed this

Twenty-eighth Day of September, 2010

David J. Kappos
*Director of the United States Patent and Trademark Office*